United States Patent [19]

Cooper et al.

[11] Patent Number: 4,528,164
[45] Date of Patent: Jul. 9, 1985

[54] CONCURRENT PRODUCTION OF ANHYDROUS NON-METAL AND METALLOID HALIDES AND CERAMIC MATERIALS WITH THE AID OF MAGNESIUM HALIDE

[75] Inventors: Emanuel Cooper, West Lafayette, Ind.; David H. Kohn, Haifa, Israel

[73] Assignee: Technion Research & Development Foundation, Inc., Haifa, Israel

[21] Appl. No.: 585,635

[22] Filed: Mar. 8, 1984

[51] Int. Cl.$^3$ .............................................. C01G 3/05
[52] U.S. Cl. .................................... 423/1; 423/76; 423/84; 423/279; 423/292; 423/293; 423/492; 423/495; 423/592; 423/593; 423/594; 423/598; 423/600; 423/636; 501/108; 501/118; 501/122; 501/136
[58] Field of Search ............... 423/292, 293, 492, 495, 423/76, 84, DIG. 12, 592–594, 598, 600, 636, 279, 1; 501/108, 122, 118, 136

[56] References Cited

U.S. PATENT DOCUMENTS

| | | | |
|---|---|---|---|
| 2,163,232 | 6/1939 | Baldeschieler | 423/293 |
| 2,805,130 | 9/1957 | Wood | 423/293 |
| 3,853,541 | 12/1974 | Othmer | 423/76 |
| 3,894,927 | 7/1975 | Kane | 204/64 R |
| 3,939,247 | 2/1976 | Fougner | 423/135 |
| 3,989,510 | 11/1976 | Othmer | 423/76 |
| 4,238,465 | 4/1980 | Chun | 423/240 |
| 4,287,167 | 9/1981 | Aitcin | 423/331 |

OTHER PUBLICATIONS

Shiro Shimada, Ryusaburo Furuichi, and Tadao Ishi, "Effect of Additives on Solid State Reaction I, A Kinetic Study of the Effects of Halides on the Formation of MgAl$_2$O$_4$", Bulletin of the Chemical Society of Japan, vol. 47 (8), pp. 2026–2030 (1974).
P. W. Atkins, *Physical Chemistry*, W. H. Freeman and Company, San Francisco, 1978, P. W. Atkins, p. 263.
C. A. Jacobson, *Encyclopedia of Chemical Reactions*, Reinhold Publishing Corp., N.Y., 1958, vol. 7, pp. 415–416, vol. 8, p. 256.
Othmer, D. F. et al., "Metal Ordering by Chlorine Affinities for Oxides", Metallurgical Society of AIME, Light Metals Committee, Proceedings of the Sessions, vol. 1, 1973, pp. 271–298.
*Chemical Abstracts* 61 15649d.
V. G. Chukhlantsev, *Docl. Akad. Nauk S.S.S.R.*, 246(5) 530 (1979).
V. Winkler et al., *Z. Anorg. Allg. Ch.*, 504, 89 (1983).
A. Garcia et al., *C. R. Acad. Sc. Paris*, 289, 157 (1979).
A. Garcia et al., *J. Electrochem. Soc.*, vol. 126, 10, 1734–1735 (1979).
Czaya, Von R., *Zeitschrift f. Anorg. u. Allg. Chemie*, Band 375, 124–127 (1970).
G. S. Frents, *Isvest. Akad. Nauk SSSR, Otdel. Tekh. Nauk*, No. 2, 235–238 (1948).
G. S. Frents, *Chem. Abstracts*, 42-6690c (1948).
Sziklavary, K. et al., *Femkohashat*, No. 109, 177–180 (1976).
Sziklavary, K. et al., *Chem. Abstracts*, 85-14266t (1976).
Kuxmann, U. et al., "Der Einfluss von Kieselsaure und anderad Beimengungen auf die chlorierte Verfluchtigung con Zink aus Zinkoxid mit Calciumchlorid, *Z. Erzbergbau Metalhuettenw.*, No. 19-8, 388–397 (1966).
Kuxmann, U. et al., *Chem. Abstracts*, 66-87731y (1967).
Kostic, E. et al., "Reaction Sintered MgAl$_2$O$_4$ Bodies from Different Batch Compositions, *Proceedings of the 3rd CIMTEC 3rd International Meeting on Modern Ceramics Technologies*, May 27–31, 1976, pp. 344–347.
Shimada, S. et al., *Chem. Abstracts*, 57-92189e (1972).

Primary Examiner—Gary P. Straub
Assistant Examiner—Jackson Leeds
Attorney, Agent, or Firm—Browdy and Neimark

[57] ABSTRACT

Molten alkaline earth metal halides are used to convert highly stable oxides into the corresponding anhydrous halides. Usually a third reactant, such as silica, is added in order to bind the basic oxide thus formed. The solid oxide compounds (e.g. silicates) which result are well-known ceramic phases of a high degree of purity.

35 Claims, No Drawings

CONCURRENT PRODUCTION OF ANHYDROUS NON-METAL AND METALLOID HALIDES AND CERAMIC MATERIALS WITH THE AID OF MAGNESIUM HALIDE

CROSS REFERENCE TO RELATED APPLICATIONS

The present application is a continuation application of application Ser. No. 533,042, filed Sept. 16, 1983, now abandoned, which in turn was a continuation of application Ser. No. 332,081, filed Dec. 18, 1981, now abandoned.

BACKGROUND OF THE INVENTION

The present invention relates to anhydrous non metal and metalloid halides, which have very important uses in various industrial applications. Thus, they are used as intermediates in the production of metals (e.g. titanium and zirconium from the corresponding tetrachlorides) and of pure oxides (e.g. $TiO_2$ and $SiO_2$ from the corresponding purified tetrachlorides). Moreover, many of these chlorides (e.g. aluminum chloride, ferric chloride, titanium chlorides) are very useful catalysts, and they also serve as starting materials for the insertion of such elements in organic compounds.

At present, some of these anhydrous non metal and metalloid halides are produced, at comparatively high temperatures, by reacting the metal oxide with a halogen, usually chlorine, and a reducing agent (mostly carbon, obtained from coke, pitch, etc.). Titanium tetrachloride, for instance, is made according to the following equation:

$$TiO_2 + 2Cl_2 + C \rightarrow TiCl_4 + CO_2(+CO) \text{ (at about 800-1000° C.)}$$

Silicon tetrachloride is usually made in two stages via silicon carbide:
(1) $SiO_2 + 3C \rightarrow SiC + 2CO$ (in an electric furnace at about 2200° C.)
(2) $SiC + 2Cl_2 \rightarrow SiCl_4 + C$ (at about 400° C.)

The use of the ever more expensive high-quality coke and energy-intensive chlorine is, of course, less appealing today than it used to be. It should also be observed at this point that the gaseous "by-products"—typically a mixture of $CO_2$, CO and some phosgene diluted by much nitrogen—are next to useless and may actually provide an additional separation problem in the course of the purification of a volatile halide such as $BCL_3$ (see Chun, U.S. Pat. No. 4,238,465).

It is also known that metal chlorides can be produced from their corresponding oxides by a process known as chloridization, i.e. the metathetic reaction of oxides with alkali chlorides such as sodium chloride, or with ammonium chloride, or with alkaline earth metal chlorides, such as calcium chloride and to a lesser extent with magnesium cloride. Thus, anhydrous stannic chloride is produced by the reaction of stannic oxides with magnesium chloride (G. S. Frents, *Izvest. Akad. Nauk S.S.S.R., Otdel. Tekh. Nauk*, 1948, 235-8; Chem. Abstr., 42,6690c (1948);

$$2MgCl_2 + SnO_2 \rightarrow SnCl_4 + 2MgO \text{ (at 700°-800° C.)}$$

Copper, nickel, cobalt and manganese are extracted from ocean floor nodule ores, in which they are present mainly in the form of oxides, by chloridizing with mixtures of alkali and alkaline earth chlorides usually at 600°-1000° C. (Kane et al, U.S. Pat. No. 3,894,927). The chloridization method has not, to our best knowledge, been applied to those oxides that are considerably more stable, from the thermodynamic point of view, than the corresponding chlorides (as shown by comparing the free energy of formation of the two compounds). This class includes many oxides, typically of elements from groups IIIA-VA and IIIB-VIB of the periodic table (e.g. titanium dioxide, zirconium dioxide, aluminum oxide, boron oxide etc.) It is an object of this invention to prove the applicability of the chloridization method—mostly by magnesium chloride—in this part of the field.

In some chloridization reactions, silica was added in order to bind the basic oxide (such as sodium or calcium oxides) formed from the chloridizing reagent, see for example K. Sziklavary, Banyasz. Kohash, Lapok, Kohasz., 109, 177-80 (1976)—*Chem. Abstr.*, 85, 146266t (1976); U. Kuxmann and F. Odor, *Z. Erzbergbau Metalhuettenw.*, 19 (8), 388-97 (1966). However, to our best knowledge there is today no published research to be found concerning the possible applications of by-products (in the quoted examples—silicates or chlorosilicates of calcium) formed in such reactions.

It is this type of compound—especially such as contain magnesium oxide chemically combined with other oxides(s)—that constitutes the second object of our invention. In particular, the magnesium silicates—forsterite ($Mg_2SiO_4$) and enstatite ($MgSiO_3$), magnesium aluminum silicate or cordierite ($Mg_2Al_4Si_5O_{18}$) and magnesium aluminate or spinel ($MgAl_2O_4$) are among the most important phases encountered in ceramic bodies, especially in refractories and in electrical ceramics. Other similar compounds, e.g. titanates of magnesium and magnesioferrite, are also components of some dielectric and ferrimagnetic materials. At present, the sources for the oxides of which the said magnesium compounds in the fired ceramic body consist are, usually:

(a) Natural minerals (such as serpentine, talc, olivine, kaolinite). Their main drawback is that only partial purification is possible, and as a rule a large part of the impurities are incorporated into the final product. (For a discussion of this problem with respect to forsterite manufacture and use and an example of partial purification of raw materials, see Aitcin, U.S. Pat. No. 4,287,167).

(b) Pure oxides and/or pure salts (such as carbonates or oxalates) which yield the oxide through thermal decomposition. The problem of the impurities is largely solved, but unfortunately the cost of the reactants limits the use.

(c) A ground mixture which consists essentially of the same crystalline phase desired in the final product, with or without additives. This starting material will often yield the products of the best quality, because of the improved microscopic uniformity of the solid, its smaller volume change during sintering and sometimes the higher sintering rate. (See, for example, Kostic & Momcilovic, in Advances in Ceramics Processings, Proceedings of the 3rd International Meeting on Modern Ceramic Technologies, Rimini, May 27-31, 1976—pp. 344-347). However, an additional step is of course required—the synthesis of the said crystalline phase, preferably by method (b)—which further raises the cost. This is mainly why pure forsterite, cordierite and enstatite are seldom used as starting materials in ceramic practice. This invention seeks to provide a remedy to this state of affairs.

The importance of pure reactants in ceramics should not be underestimated. Not so long ago, impurities in the raw materials were often treated as a "blessing in disguise" (indeed sometimes they still are), since they tend to widen the firing temperature range of ceramic bodies by lowering the lowest eutectic temperature in the system. With the continuously improving temperature control in firing ovens, the firing range factor has lost much of its importance. At the same time, the growing demand for specialized, high quality electrical ceramics underlines the shortcomings of bodies fabricated from impure raw materials. Likewise, owing to the increasing prices of refractories and to the increasing importance of good energy management, steel producers and other users have been growing increasingly more demanding with respect to quality and durability of refractories.

SUMMARY OF THE INVENTION

It has now been found by us that metal and metalloid oxides that are thermodynamically more stable than their corresponding chlorides can be transformed into a chloride by reaction with anhydrous magnesium chloride. These reactions are preferably carried out in the presence of silica which serves to bind the basic magnesium oxide formed in the course of the reaction, but alumina and certain minerals, e.g. kaolinite, talc, etc. may also be used for the purpose.

Thus, the anhydrous chlorides of titanium, aluminum, zirconium and boron have been produced from the corresponding oxides (or oxide compounds) by reaction with magnesium chloride. Also, the oxides of tin and iron ($SnO_2$ and $Fe_2O_3$), the chloridization of which is already known, have been converted into chlorides by our newly developed process, without any reducing agent, in better yields than previously reported.

The chloridized material may be not just a simple oxide, but a compound of two or more oxides, either a natural mineral—like zircon ($ZrSiO_4$) or kaolinite—or a synthetic compound like boron phosphate ($BPO_4$). Compounds such as $ZrSiO_4$ and $BPO_4$ may be broadly considered as oxides of Zr and B, respectively, as these elements are both coordinated by oxygen as are the Si and P. Such compounds may be referred to as "mixed oxides of at least two metal or metalloid elements" in the present specification and claims.

It has also been found that in addition to the production of the different aforesaid anhydrous metal and metalloid chlorides, various magnesium compounds are also obtained. Most of them are well-known ceramic materials, e.g. the already mentioned forsterite, enstatite, spinel, cordierite, titanates of magnesium ($MgTiO_3$ and $MgTi_2O_5$), and magnesioferrite ($MgFe_2O_4$). The ceramic materials obtained by the process of the present invention are of a surprisingly high degree of purity, although the starting materials—minerals and/or the magnesium chloride melt—may contain various impurities, especially the oxides or chlorides of alkali metals, calcium and iron. In the course of the process, the oxide impurities are converted into the corresponding chlorides, of which the volatile ones (such as ferric chloride) are removed by evaporation and separated from the main volatile product by distillation; the less volatile (such as $CaCl_2$ and the alkali chlorides) are soluble in $MgCl_2$ and are concentrated in the liquid chloride phase. At the same time, the ceramic product is precipitated in the form of small crystals, usually in the range of 1–200 microns. Thus, the process may also be looked upon as a purification by crystallization, as far as the ceramic product is concerned. It may be applied in removing troublesome impurities from ceramic raw materials (e.g. iron oxides from serpentine and kaolinite) as well as in extracting valuable elements which are minor components of the raw material (e.g. titanium as $TiCl_4$ from kaolinite and nickel as $NiCl_2$ from serpentine).

Furthermore, it was found possible to use technical magnesium chloride, instead of the dry and pure product, and to remove the water and magnesium oxide present by preheating in the presence of silica. Any magnesium oxide formed by hydrolysis reacts and yields forsterite.

EXAMPLES

Example 1

The object: Preparation of $TiCl_4$ and magnesium titanates by reaction between $TiO_2$ and $MgCl_2$ without additional compounds.

The main reaction: $3TiO_2 + 2MgCl_2 \rightarrow TiCl_4 + 2MgTiO_3$ 0.321 g $TiO_2$ and 5.66 g anhydrous $MgCl_2$, i.e. at a molar ratio of 1:14, were mixed and then heated for 2 hrs. in a stream of dry nitrogen (80 cm$^3$/min) at 650°–680° C. in order to remove traces of water. The temperature was then rapidly raised to 1075° C. and kept there for 1.3 hrs. The yield of $TiCl_4$ was 29% (referred to $TiO_2$). The solid residue, after washing away the soluble $MgCl_2$, was a mixture of $MgTiO_3$ and $MgTi_2O_5$.

Example 2

The object: Preparation of $TiCl_4$ in the conditions of Example 1, but with the addition of silica ($SiO_2$).

The reaction: $TiO_2 + 2MgCl_2 + 2SiO_2 \rightarrow TiCl_4 + 2MgSiO_3$ 0.315 g $TiO_2$, 0.706 g $SiO_2$ (ground quartz), and 5.22 g anhydrous $MgCl_2$ (molar ratios: 1:3:14) were mixed and dried as in Example 1. Maintenance at 1075° C. for 1.8 hrs. resulted in an 88% conversion of $TiO_2$ and a measured yield of 77% of $TiCl_4$. The solid residue consists mainly of enstatite ($MgSiO_3$), besides some quartz.

Example 3

The object: Preparation of $TiCl_4$ at a lower reaction temperature.

Working in the conditions described in Example 2, but at 945° C. for 5.8 hrs produced $TiCl_4$ at a yield of 78%. The solid residue consists mainly of enstatite, besides some quartz.

Example 4

The object: Preparation of $TiCl_4$, borax being used for binding magnesium oxide.
The reaction: $3TiO_2 + 8MgCl_2 + 2Na_2B_4O_7 \rightarrow 3TiCl_4 + 4Mg_2B_2O_5 + 4NaCl$ 0.339 g $TiO_2$, 0.761 g $SiO_2$, 0.848 g anhydrous $Na_2B_4O_7$ and 4.79 g anhydrous $MgCl_2$ (molar ratio 1:3:1:12) were mixed, preheated for 2 hrs at 620° C. and then kept for 5 hrs at 945° C., all the time under a stream of 80 cc/min of dry nitrogen. The yield of $TiCl_4$ was 69% after 2.5 hrs at the temperature given and 78% after 5 hrs. The solid residue consisted mainly of magnesium pyroborate ($Mg_2B_2O_5$) and silica (the latter did not react, but was partly changed from quartz to another polymorph of silica, namely cristobalite).

Example 5

The object: Preparation of $AlCl_3$ and spinel by the reaction of $Al_2O_3$ and $MgCl_2$ without additional compounds.
The reaction: $4Al_2O_3 + 3MgCl_2 \rightarrow 2AlCl_3 + 3MgAl_2O_4$ 1.95 g $Al_2O_3$ and 5.45 g anhydrous $MgCl_2$ (molar ratio: 1:3) were mixed, then dried at 680° C. for 2 hrs then the temperature was raised to 1000° C. in 25 minutes and kept there for 4 hrs, while supplying a steady stream of dry nitrogen (100 cm$^3$/min). The yield of $AlCl_3$, based on $Al_2O_3$, was 4%. The solid residue contained spinel ($MgAl_2O_4$), in addition to $\alpha$-$Al_2O_3$.

Examples 1-5 were carried out without stirring while the reaction was taking place. The following examples, Nos. 6-22, were carried out under continuous stirring.

Example 6

The object: Preparation of $TiCl_4$ and forsterite, at a molar ratio of $SiO_2/TiO_2 = 1$, with stirring.
The reaction: $TiO_2 + 2MgCl_2 + SiO_2 \rightarrow TiCl_4 + Mg_2SiO_4$ 0.542 g $TiO_2$, 0.407 g $SiO_2$ (ground quartz) and 9.05 g anhydrous $MgCl_2$ (molar ratios: 1:1:14) were mixed and preheated in a reactor for 2 hrs at 650° C.–680° C. with stirring (300 rpm) and under a stream of dry nitrogen (80 cc/min). The temperature was then raised to 1010° C. and kept there for 5 hrs, the other conditions being left constant. The yield of $TiCl_4$ was 82% after 3 hrs and 86% after 5 hrs. The solid residue was mainly crystalline forsterite, its particle size range 5-100 microns.

Example 7

The object: Preparation of $TiCl_4$ and enstatite, at a molar ratio of $SiO_2:TiO_2 = 3$, with stirring.
The reaction: $TiO_2 + 2MgCl_2 + 2SiO_2 \rightarrow TiCl_4 + 2MgSiO_3$ 0.518 g $TiO_2$, 1.164 g $SiO_2$ and 8.62 g anhydrous $MgCl_2$ (molar ratios: 1:3:14) were pretreated as in Example 3 and then kept for 3.3 hrs at 1010° C. under the same conditions; yield of $TiCl_4$—77%. The solid residue consists mainly of enstatite, in the form of elongated, 10-30 microns long, clincenstatite crystals.

Example 8

The object: As in Example 7, but with a slower stream of nitrogen (22-25 cm$^3$/min). After 3 hrs at 1010° C. the yield of $TiCl_4$ was 78% and after 5.1 hrs it was 86%.

Example 9

The object: Preparation of $TiCl_4$ and forsterite using fired talc for binding the magnesia.

Talc was first fired at 1000°–1050° C. for 1 hr to give a mainly amorphous material, the empirical formula of which is approximately $Mg_3Si_4O_{11}$.

The reaction: $5TiO_2 + 10MgCl_2 + 2Mg_3Si_4O_{11} \rightarrow 5TiCl_4 + 8Mg_2SiO_4$ 0.542 g $TiO_2$, 1.03 g fired talc and 8.99 g anhydrous $MgCl_2$ (molar ratios: 1:0.42:14) were treated as in Example 6. After 4.2 hrs at 1010° C., the conversion of $TiO_2$ was 88%. The solid residue was mainly forsterite, crystal size: 50-150 microns. Only 0.01% $Fe_2O_3$, 0.03% CaO and about 0.001% $Na_2O$ were present in the residue, while the fired talc in the feed contained 2.1% $Fe_2O_3$, 0.1% CaO and 0.05% $Na_2O$. Most of the iron was volatilized as $FeCl_3$.

Example 10

The object: Preparation of $TiCl_4$ and forsterite using fired serpentine for binding the magnesia.

Serpentine was first fired at 1000° C. for 1 hr to give a mixture of forsterite and amorphous material, approximating the empirical formula $Mg_3Si_2O_7$.

The reaction: $TiO_2 + 2MgCl_2 + 2Mg_3Si_2O_7 \rightarrow TiCl_4 + 4Mg_2SiO_4$ 0.270 g $TiO_2$, 2.08 g fired serpentine and 9.73 g anhydrous $MgCl_2$ (molar ratios: 1:2:30) were treated as in Example 6. After 3.3 hrs the conversion of $TiO_2$ was 94%. The solid residue was mainly forsterite (crystal size: 30-150 microns). Only 0.02% $Fe_2O_3$ and 0.01% CaO were present in the residue, as compared to 1.4% $Fe_2O_3$ and 0.04% CaO in the fired serpentine feed.

Example 11

The object: Preparation of $TiCl_4$ and cordierite using fired kaolinite for binding the magnesia.

Kaolinite was first fired at 1030° C. for 1 hr, yielding a mainly amorphous material, the empirical formula of which is essentially $2Al_2O_3 \cdot 4.3\,SiO_2$.

The reaction: $TiO_2 + 2MgCl_2 + 2Al_2O_3 \cdot 4.3SiO_2 \rightarrow TiCl_4 + Mg_2Al_4Si_5O_{18}$ 0.225 g $TiO_2$, 2.52 g fired kaolinite which contained an additional 0.061 g $TiO_2$, and 0.212 g quartz were mixed with 9.67 g anhydrous $MgCl_2$ and treated as in example 8. After 1.8 hrs at 1010° C., the conversion of $TiO_2$ was 88%. Apart from $TiCl_4$ (2.65 m mol), 0.54 m mol $AlCl_3$ and 0.39 m mol $FeCl_3$ were also recovered. The solid residue was essentially pure cordierite (average particle diameter: 3.1 microns), with only traces of quartz and mullite. It contained 0.05% $Fe_2O_3$ and 0.01% $K_2O$, as against 1.2% $Fe_2O_3$ and 0.36% $K_2O$ in the fired kaolinite in the feed.

Example 12

The object: Preparing $AlCl_3$ and cordierite and extracting Ti as $TiCl_4$ by reacting fired kaolinite with $MgCl_2$.
The reaction: $8Al_2O_3 + 15SiO_2 + 6MgCl_2$.
The reaction: $8Al_2O_3 + 15SiO_2 + 6MgCl_2 \rightarrow 4AlCl_3 + 3Mg_2Al_4Si_5O_{18}$ 2.35 g fired kaolinite (as in Example 11) and 0.213 g quartz were mixed with 9.02 g anhydrous $MgCl_2$ and heated as in Example 11. After 1.2 hrs at 1010° C. the evaporable products were $AlCl_3$ (1.36 m mole 6.5% yield based on Al$_2$O$_3$ in the feed), TiCl$_4$ (0.41 m mol) and FeCl$_3$ (0.31 m mol). The solid residue was mainly cordierite (average particle diameter: 1.3 microns), with small amounts of quartz and mullite. Its content of impurities was 0.10% Fe$_2$O$_3$, 0.01% K$_2$O and 0.6% TiO$_2$, as against 1.2%, 0.36% and 2.4%, respectively in the feed of fired kaolinite.

Example 13

The object: Preparation of TiCl$_4$ and spinel using alumina for binding the magnesia.
The reaction: TiO$_2$+2MgCl$_2$+2Al$_2$O$_3$→TiCl$_4$+2-MgAl$_2$O$_4$ 0.515 g TiO$_2$, 1.60 g Al$_2$O$_3$ and 8.58 g anhydrous MgCl$_2$ (molar ratios: 1:2.4:14) were reacted as in Example 11. After 4 hrs at 1010° C. TiCl$_4$ at a yield of 79% (5.04 m mole) and also some AlCl$_3$ (0.84 m mole) were obtained. The solid consisted mainly of spinel (particle size-about 5 microns) and also of some cordierite, originating in the reaction of the formed spinel with a silica impurity (in this case—the silica-glass reactor):

2MgAl$_2$O$_4$+5SiO$_2$→Mg$_2$Al$_4$Si$_5$O$_{18}$

The said impurity was easily dissolved by washing the residue for about 5 min. with a boiling 5:1 mixture of 20% HCl and 40% HF. This treatment left the spinel practically unharmed and showing a perfectly clean X-ray powder pattern.

Example 14

The object: Preparation of ZrCl$_4$ by reacting ZrSiO$_4$ with MgCl$_2$.
The reaction: ZrSiO$_4$+2MgCl$_2$→ZrCl$_4$+Mg$_2$SiO$_4$ 1.10 g zircon was mixed with 8.03 anhydrous MgCl$_2$ (molar ratio: 1:14), pretreated as in Example 6 and then reacted with stirring at 120 rpm for 3.5 hrs at 1075° C. under a stream of 80 cm$^3$/min of dry nitrogen. The yield of ZrCl$_4$ was 6.5%.

Example 15

The object: Preparation of ZrCl$_4$ by reacting zircon with MgCl$_2$, boracite being added to bind the magnesia.
The main reaction: 9ZrSiO$_4$+16MgCl$_2$+4Mg$_3$B$_7$O$_{13}$Cl→9ZrCl$_4$+14Mg$_2$B$_2$O$_5$+9SiO$_2$ 1.10 g zircon and 1.35 g boracite (prepared from Na$_2$B$_4$O$_7$, molten anhydrous MgCl$_2$ and some MgO) were mixed with 9.20 g anhydrous MgCl$_2$ and preheated as in Example 6. The mixture was subsequently heated to 1010° C. and kept for 3.5 hrs with stirring under inert gas conditions as in Example 14. The yield of ZrCl$_4$ was 40%; some boron chloride was also formed.

Example 16

The object: Producing boron trichloride from boron phosphate.
(a) The reaction: BPO$_4$+2MgCl$_2$→BCl$_3$+Mg$_2$PO$_4$Cl 1.60 g boron phosphate was mixed with 7.41 g anhydrous MgCl$_2$ (molar ratio: 1:5.1), preheated under dry nitrogen (50 cm$^3$/min) at 400°–550° C. for 2 hrs, and then stirred (at 120 rpm) for 3 hrs at 740° under the same gas stream. The yield of BCl$_3$ was 51% after 40 min, 61% after 3 hrs. Another 23% of the boron introduced in the feed was found in the form of a white solid, which is deposited along the cooling path of the gas stream. It is easily soluble in water, yielding mainly H$_3$BO$_3$—which may be recycled to produce more BPO$_4$—and some HCl.

The solid residue, left after washing with water, consists mainly of Mg$_2$PO$_4$Cl, with some Mg$_2$P$_2$O$_7$ present; it is soluble in acids and may be used for recycling the H$_3$PO$_4$ values to produce more BPO$_4$.

(b) 1.06 g BPO$_4$, 9.0 g anhydrous MgCl$_2$, 2.35 g NaCl and 2.35 g KCl (molar ratio of the reactants: 1:9.5; molar percentage of the components in the melt: 57% MgCl$_2$, 24% NaCl, 19% KCl) were heated for 30 min. at 550° under a stream of nitrogen (about 120 cm$^3$/min). The yield of BCl$_3$ after 20 minutes was 5%; afterwards the reaction rate dropped considerably. For comparison, the yield in the first 20 minutes in part (a) was about 44%.

Example 17

The object: Producing boron trichloride from boron phosphate by reaction with CaCl$_2$.
The reaction: BPO$_4$+2CaCl$_2$→BCl$_3$+Ca$_2$PO$_4$Cl.

1.27 g BPO$_4$ and 9.37 g anhydrous CaCl$_2$ (molar ratio 1:7) were heated gradually to 720° over a 1 hr. period, then were stirred (at 120 rpm) for 5.5 hrs. at 860° C. under a stream of 50 cm$^3$/min dry nitrogen. The yield of BCl$_3$ was 65%; some white, water soluble, boron-containing solid (see Example 16) was also deposited along the exiting path of the gas.

The solid residue, left after washing with water, consists essentially of Ca$_2$PO$_4$Cl, with traces of Ca$_2$P$_2$O$_7$. It is soluble in acids and may be used for recycling the H$_3$PO$_4$—values to produce more BPO$_4$.

Example 18

The object: Preparation of TiCl$_4$ and forsterite using technical, instead of pure MgCl$_2$.
The reactions: 2MgO+SiO$_2$→Mg$_2$SiO$_4$ TiO$_2$+2MgCl$_2$+SiO$_2$→TiCl$_4$+Mg$_2$SiO$_4$ 11.0 g technical, partly dried magnesium chloride (Analysis: MgCl$_2$—81.7%; H$_2$O—7.9%; CaCl$_2$—4.8%; MgO—3.4%; KCl—0.8%; NaCl—1.4%) were mixed with 0.41 g CaCl$_2$, 0.10 g KCl, 0.13 g NaCl and 0.29 g FeCl$_2$ in order to increase the concentration of impurities. This was done with the aim of helping to prove the feasibility of the reaction as a continuous process, since it is known that in such processes impurities often accumulate in the fluid phase, a problem that must be addressed for each case individually. 1.15 g SiO$_2$ was added (molar ratio SiO$_2$/MgO=1:2, accounting for partial hydrolysis) and the mixture was heated gradually to 1010° C. during a 30 minute period under a stream of dry nitrogen (30 cm$^3$/min initially, 80 cm$^3$/min subsequently) and with stirring (300 rpm). After keeping the mixture for another 1 hr. at 1010° C., 0.52 g TiO$_2$ and 0.39 g SiO$_2$, molar ratio 1:1, were added and the reaction carried on for 5.5 more hrs. under the same conditions. Conversion of TiO$_2$: 91%. The solid residue consisted mainly of forsterite (average particle diameter: 6.8 microns). It contained a very low percentage of impurities: FeO—0.07%; Na$_2$O—0.04%; K$_2$O—0.01%; CaO—0.04%. For comparison the content of impurities in the starting melt (before addition of TiO$_2$) was: FeCl$_2$—3.4%; NaCl—3.4%; KCl—2.3%; CaCl$_2$—11.5%.

Example 19

The object: Preparation of cordiertie by reacting fired keolinite with technical, partly dried MgCl$_2$.
The main reaction: $2Al_2O_3.4.3SiO_2+0.7SiO_2+2MgO \rightarrow Mg_2Al_4Si_5O_{18}$ 10.7 g fired kaolinite (of the same composition as in Example 11), 0.90 g quartz and 10.8 g technical, partly dried MgCl$_2$ (of the same composition as in Example 18) were mixed and heated gradually to 1010° C. during a 30-min. period under a stream of dry nitrogen (40 cm$^3$/min) and with stirring (300 rpm). After 2.5 hrs. at 1010° C. the evaporable compounds, such as TiCl$_4$, FeCl$_3$ and some AlCl$_3$, had been removed with the gas stream. The solid product was mainly cordierite (average particle diameter: 9.2 microns) with traces of quartz. It contained a low percentage of impurities: 0.5% TiO$_2$, 0.05% Fe$_2$O$_3$, 0.08% CaO, 0.03% Na$_2$O and 0.01% K$_2$O, as against 2.4% TiO$_2$, 1.2% Fe$_2$O$_3$ and 0.36% K$_2$O in the fired kaolinite, and 7.1% CaCl$_2$, 2.1% NaCl and 1.2% KCl in the melt (after hydrolysis is concluded).

Example 20

The object: Preparation of TiCl$_4$ and forsterite in a regime of continuously rising temperature with a view to achieving a constant rate of reaction.
The reaction: $TiO_2+2MgO+SiO_2 \rightarrow TiCl_4+Mg_2SiO_4$ 0.539 grams TiO$_2$, 0.406 g SiO$_2$ and 9.00 g anhydrous MgCl$_2$ (molar ratio: 1:1:14) were mixed and preheated as in Example 6. After rapidly heating to 1010° C. the temperature was continuously raised during 2 hours at a rate of 0.6° C./min until it reached 1085° C. and was kept there for 30 minutes. The yield of TiCl$_4$ was 76% after 1.7 hrs, during which the rate was almost constant: 0.049±0.004 m mol (TiCl$_4$/min. The overall yield was 85%.

Example 21

The object: Preparation of TiCl$_4$ and forsterite; continuous addition of starting materials in order to achieve a constant rate of reaction.
The reaction: $TiO_2+2MgCl_2+SiO_2 \rightarrow TiCl_4+Mg_2SiO_4$ 0.539 g TiO$_2$, 0.405 g SiO$_2$ and 8.96 g anhydrous MgCl$_2$ (molar ratios: 1:1:14) were mixed and preheated as in Example 6 and then heated rapidly to 1010° C. At that temperature, under a constant stream of nitrogen (80 cm$^3$/min) and with stirring (300 rpm), compressed pills (0.26±0.025 g each) of a mixture of TiO$_2$, SiO$_2$ and anhydrous MgCl$_2$ (molar ratio: 1:1:2.7) were introduced into the reactor at about the same rate at which TiCl$_4$ was produced (approximately once every 15 minutes). During the first hour the rate of reaction steadily decreased, from 0.061 to 0.035 mmol TiCl$_4$min, but afterwards it remained constant at 0.0335±0.0025 mmol TiCl$_4$/min for 1.8 hrs. During that latter period, 4.7 mmol TiO$_2$ were added and 3.67 mmol—in a yield of 78% TiCl$_4$—were produced. The overall yield of TiCl$_4$ during 2.8 hrs. was 50%.

Example 22

The object: Removal of iron oxides from chromite by reaction with MgCl$_2$, using Al$_2$O$_3$ for binding the magnesia.
The main reactions: $MgCl_2+FeCr_2O_4 \rightarrow FeCl_2+MgCr_2O_4$  $3MgCl_2+4Al_2O_3+2MgCrFeO_4 \rightarrow 2FeCl_3+MgCr_2O_4+4MgAl_2O_4$ A chromite mineral—(Mg,Fe)$^{2+}$ (Cr,Al,Fe)$_2^{3+}$ O$_4$—was used which contained 20% combined iron oxides in both divalent and trivalent states.

5.01 g chromite, 4.01 g alumina and 9.75 g anhydrous MgCl$_2$ were preheated for 30 minutes at 650°-680° with stirring (250 rpm) under a stream of 80 cm$^3$/min dry nitrogen. Then the temperature was quickly raised to 1010° and maintained there for 3 hrs. under a stream of 22 cm$^3$/min N$_2$. The combined yield of FeCl$_3$ and FeCl$_2$ was 85%; on the other hand, only about 1% of the Cr$_2$O$_3$ in the starting material was chloridized. The X-ray powder pattern of the lilac-greyish residue showed the presence of MgCr$_2$O$_4$ and MgAl$_2$O$_4$ (as separate phases), Al$_2$O$_3$, and also traces of cordierite, originating in the reaction of silica impurities with MgAl$_2$O$_4$. After applying the acid treatment described in Example 13, the residue lost 6% in weight and the cordierite lines disappeared from the X-ray pattern.

General Experimental Conditions

In the experiments carried out according to this invention, the conditions were generally as follows:

1. The liquid phase consisted mainly of a molten alkaline earth halide, preferably in large excess over the stoichiometric quantities of the metal oxides. This ensures the presence of enough liquid to preserve a relatively fluid suspension right up to the end of the reaction.

2. The solid reactants were usually in the form of fine powders, the greater part of which passed through a 300 mesh sieve. Our experience suggests, however, that much coarser fractions may be used with only a slight decrease in the reaction rate, provided that stirring is used.

3. The volume of the solids at the start of the reaction was preferably 5-20% of the total volume. In the course of the reaction that volume percentage increased. The reactions are still feasible, however, at much higher volume fractions of solids (see Examples 19 and 22).

4. The reactions were carried out at temperatures ranging from 680° C. to 1100° C. At lower temperatures most of the reactions, while feasible, suffer a rapid decrease in both rate and equilibrium constants, which usually makes the reactions impractical. At temperatures higher than about 1100° C., on the other hand, it becomes increasingly difficult to control the evaporation of many of the halides involved, especially MgCl$_2$ (but not CaCl$_2$), and also to find suitable construction materials for the reactor.

The reactions as described in Examples 1-22 were carried out in a reaction tube made of silica glass. This was placed in an electric oven which permitted rapid heating and cooling. The experiments of Examples 1-5 were carried out without stirring, whereas in the others (6-22) stirring, mostly at 300 rpm, was applied by means of a silica-glass mechanical stirrer. Stirring has a beneficial effect, which is the more important the lower the temperature, on the reaction rate.

During the reaction dry nitrogen gas was passed through the reacto usually at rates of 20–100 cm$^3$/min. in order to remove any evaporable products and to shift the equilibrium in the required direction. Another gas which is inert under the reaction conditions, such as $CO_2$ or a $CO_2/N_2$ mixture, may also be used. The water and oxygen content of the inert gas is not critical, inasmuch as it is controlled and a proper excess of the acid solid oxide compound (such as $SiO_2$) is provided in order to react with any basic oxide originating in the hydrolysis and/or oxidation side reactions.

The gaseous mixture, i.e. the nitrogen charged with the evaporable product, was passed through a number of cooled traps in order to collect the said product. Since some of the reacting halide was usually evaporated, the reaction unit in Examples 6–22 used a vertical, rather than horizontal, reaction tube, and a secondary heating mantle which practically transformed the upper part of the tube into a reflux condenser; by this sample device most of the evaporated halide could be returned to the reaction zone.

The volatile products were usually analyzed by classical volumetric methods or by atomic absorption/-flame-emission photometry (AA/FE) methods, after dissolving them in acid solutions. The analytical methods for the solid reactants and proucts were one or more of the following: X-ray powder diffractometry, AA/FE after dissolution in HF in a Teflon bomb, average particle size determination by means of a Fisher Sub-Sieve Sizer.

In the reactions in which $TiCl_4$ was formed, we repeatedly found a difference of about 8–15% between the yield of $TiCl_4$, as measured by analysis of the volatile product, and the conversion of $TiO_2$, as measured by analysis of the residue. This reflects the cumulative effect of various technical factors which lead to small losses of the gaseous product. Very nearly quantitative conversions may be obtained by a substantial increase of the process duration. It does not seem to be very practical or important, however. On one hand, the reaction becomes very slow near its end, and under high temperature, high corrosion rate conditions efficient use of the reactor lifetime is of the essence. On the other hand, $TiO_2$ is one impurity the inclusion of small amounts of which is actually desirable in most uses of the ceramic materials previously described. While it has very little effect on refractoriness, it greatly raises the sintering rate (see for example L. G. Girgis and M. A. Fahim, *Ceramurgia*, 7 (6), 315-21 (1957). It also tends to raise the dielectric constant and to lower dielectric loses, making it a suitable additive for electrical ceramics.

Summarizing the process of the invention, the following may be said:

1. Anhydrous nonmetal and metalloid halides are produced by a reaction bewen a molten alkaline earth halide and the corresponding metal and metalloid oxides or oxide compounds. Unlike the prevailing methods, no reducing agent is needed, unless the purpose is to produce a halide in which the oxidation number of the metal is lower than in the corresponding oxide which serves as starting material.

2. It should be emphasized that in most of the reactions investigated and serving as the bases of the examples, the free energy of reaction, $\Delta G_r$, according to thermochemical calculations, is positive in standard conditions, which on first sight seems to mean that the desired reaction, such as the conversion of an oxide into the corresponding chloride, "should not occur". Yet by working not at atmospheric but at a reduced pressure of the chloride produced, accomplished either in the presence of an inert gas such as nitrogen, or by artificially created vacuum, or both, the product chloride is removed continuously from the reactor, and thus the equilibrium is shifted in the right direction.

In most cases compounds such as $SiO_2$ and/or $Al_2O_3$ *were added to the mixture in order to bind the basic MgO formed during the reaction. This again facilitates the shifting of the equilibrium in the desired direction, although this means will usually not suffice to raise the partial pressure of the chloride product to* 1 atm, in other words to make it boil out spontaneously.

3. A special advantage of the process of the invention is that the ceramic materials obtained are of a high degree of purity, although the raw materials in the feed may contain relatively elevated percentages of impurities, among them the oxides and/or chlorides of alkali metals, calcium, iron, etc. The crystalline ceramic materials are usually of a particle size small enough to eliminate the need of grinding, yet large enough to be relatively easy to filter after the chloride phase is dissolved.

4. A further interesting application of the process of this invention, therefore, is its use as a method for the purification of ceramic material, e.g. the removal of $Fe_2O_3$ in the form of anhydrous $FeCl_3$—value in itself—from kaolinite.

5. Although in most of the examples given pure anhydrous $MgCl_2$ was used, the reaction can also be carried out with technical grade $MgCl_2$, containing several percentages of water, some MgO, and other metal chlorides.

While the invention has been described in detail, it is clearly understood that this is intended by way of illustration and example only and is not to be taken by way of limitation. The spirit and scope of this invention is limited only by the terms of the following claims.

We claim:

1. A process for the concurrent production of a volatile anhydrous halide of titanium, aluminum, zirconium, boron, trivalent iron or a combination thereof, as well as a crystalline ceramic compound, consisting essentially of:

mixing a technical grade halide of magnesium, calcium or divalent iron with a second oxide selected from the group consisting of oxides of silicon, aluminum, boron, phosphorus, chromium and titanium or a natural mineral containing one or more of said oxides;

heating the mixture to a temperature in the range of 550°–1100° C.;

admixing a first oxide selected from the group consisting of oxides of titanium, aluminum, zirconium, boron and trivalent iron, or compounds of natural minerals containing one or more of said oxides, said first oxide being the same as or different from said second oxide;

subjecting the mixture so obtained to a temperature in the range of 550°–1100° C., in an atmosphere which is dry and substantially inert, while continuously withdrawing evolved gaseous components;

recovering the volatile halide of titanium, aluminum, zirconium, boron trivalent iron or combination thereof present in said withdrawn gaseous components; and recovering the crystalline ceramic compound which results from said reacting step.

2. A process in accordance with claim 1, wherein said first and said second oxides are different and said admixing step further includes the addition of additional second oxide along with said first oxide.

3. A process in accordance with claim 1, wherein said second oxide is silica.

4. A process in accordance with claim 1, wherein said technical grade halide in said mixing step is technical grade magnesium chloride.

5. A process in accordance with claim 3, wherein said first oxide is aluminum oxide.

6. A process for the production of a volatile anhydrous halide of titanium, aluminum, zirconium, boron, trivalent iron or a combination thereof, as well as the concurrent production of a crystalline ceramic compound, consisting essentially of:
reacting a first oxide selected from the group consisting of
  (1) an oxide of titanium, aluminum, zirconium, boron or trivalent iron and
  (2) a compound which is a mixed oxide of at least two metal or metalloid elements, at least one of which is titanium, aluminum, zirconium, boron or trivalent iron,
with a substantially anhydrous halide reactant selected from the group consisting of the the halides of magnesium, calcium and divalent iron, in a sufficient excess of said halide reactant to ensure the presence thereof throughout the reacting step, at a temperature of at least 550° C. in an atmosphere which is dry and substantially inert, while continuously withdrawing evolved gaseous components and forming, in a liquid phase of said halide reactant, a substantially pure crystalline ceramic compound having a particle size of about 1 to about 200 microns, said crystalline ceramic compound containing at least two of the metal or metalloid elements of said reactants;
recovering from said withdrawn gaseous components the volatile halide of the metal or metalloid present in said first oxide; and
recovering said crystalline ceramic compound from said halide reactant.

7. A method in accordance with claim 6, wherein said first oxide is selected from the group consisting of $BPO_4$, an oxide of titanium, aluminum, zirconium or trivalent iron, and a compound which is a mixed oxide of at least two metal or metalloid elements, at least one of which is titanium, aluminum, zirconium or trivalent iron.

8. A process in accordance with claim 6, wherein said first oxide is $BPO_4$.

9. A process in accordance with claim 6, wherein said halide reactant is a chloride or a bromide.

10. A process in accordance with claim 6, wherein said halide reactant is present in sufficient excess to ensure sufficient liquid halide reactant to preserve a fluid suspension during the entire reacting step.

11. A process in accordance with claim 6, wherein said reacting step is carried out at a temperature in the range of 550°–1100° C.

12. A process in accordance with claim 6, wherein said reacting step takes place under constant stirring.

13. A process in accordance with claim 6, wherein said first oxide is titanium oxide.

14. A process in accordance with claim 6, wherein said first oxide is zirconium oxide.

15. A process in accordance with claim 6, wherein said first oxide is aluminum oxide.

16. A process in accordance with claim 6, wherein said substantially dry halide used in said reacting step is anhydrous magnesium chloride.

17. A method in accordance with claim 6, wherein said reacting step includes as a further reactant in said excess of halide reactant, a second oxide selected from the group consisting of oxides of silicon, aluminum, boron, phosphorus, chromium and titanium or a natural mineral compound containing one or more of said oxides, said second oxide being different from said first oxide.

18. A process in accordance with claim 17, wherein said second oxide is silica.

19. A process in accordance with claim 18, wherein said substantially dry halide used in said reacting step is anhydrous magnesium chloride.

20. A process in accordance with claim 6, wherein said reacting step takes place in a stream of substantially dry inert gas.

21. A process in accordance with claim 6, wherein said reacting step takes place under subatmospheric pressure.

22. A process in accordance with claim 6, wherein said reacting step takes place in a stream of substantially dry inert gas and under subatmospheric pressure.

23. A process for the production of ceramic materials consisting essentially of:
reacting a first oxide selected from the group consisting of
  (1) an oxide of titanium, aluminum, zirconium, boron or trivalent iron and
  (2) a compound which is a mixed oxide of at least two metal or metalloid elements, at least one of which is titanium, aluminum, zirconium, boron or trivalent iron,
with a substantially anhydrous halide reactant selected from the group consisting of the halides of magnesium, calcium and divalent iron, in a sufficient excess of said halide reactant to ensure the presence thereof throughout the reacting step, at a temperature of at least 550° C. in an atmosphere which is dry and substantially inert, while continuously withdrawing evolved gaseous components and forming, in a liquid phase of said halide reactant, a substantially pure crystalline ceramic compound having a particle size of about 1 to about 200 microns, said crystalline ceramic compound containing at least two of the metal or metalloid elements of said reactants;
recovering said crystalline ceramic compound from said halide reactant.

24. A process in accordance with claim 23, wherein said reacting step includes as a further reactant in said excess of halide reactant, a second oxide selected from the group consisting of oxides of silicon, aluminum, boron, phosphorus, chromium and titanium or a natural mineral compound containing one or more of said oxides said second oxide being different from said first oxide.

25. A process in accordance with claim 23, wherein at least one of said first oxide and said halide reactant include at least one impurity selected from the group consisting of oxides and/or chlorides of alkali metals, calcium and/or iron, and wherein said at least one impurity is converted to the corresponding halide, in the case of oxide impurities, and either volatilized or dissolved in said liquid phase, and said crystalline ceramic compound is substantially free of said at least one impurity.

26. A process in accordance with claim 25, wherein said first oxide is a natural mineral which has been fired to remove water therefrom.

27. A process in accordance with claim 23, wherein said halide reactant is a chloride or a bromide.

28. A process in accordance with claim 23, wherein said halide reactant is present in sufficient excess to ensure sufficient liquid halide reactant to preserve a fluid suspension the entire reacting step.

29. A process in accordance with claim 24, wherein said first and second oxides are combined in a single natural mineral.

30. A process in accordance with claim 29, wherein said single natural mineral is fired kaolinite, said halide reactant is magnesium halide and said crystalline ceramic compound is cordierite.

31. A process in accordance with claim 23, wherein said reacting step is carried out at a temperature in the range of 550°–1100° C.

32. A process in accordance with claim 29, wherein said single natural mineral is fired kaolinite or fired serpentine.

33. A process in accordance with claim 23, wherein said first oxide is titania, said halide reactant is magnesium halide and said crystalline ceramic material is a magnesium titanate.

34. A process in accordance with claim 24, wherein said halide reactant is magnesium halide, said second oxide contains silica and said crystalline ceramic material comprises enstatite or forsterite.

35. A process in accordance with claim 23, wherein said halide reactant is magnesium halide, said first oxide is alumina and said crystalline ceramic material is magensium aluminate.

* * * * *